United States Patent
Konami

(10) Patent No.: US 9,727,714 B2
(45) Date of Patent: Aug. 8, 2017

(54) AUTHENTICATION CONTROL SYSTEM, AUTHENTICATION CONTROL METHOD, AND PROGRAM

(71) Applicant: SONY CORPORATION, Tokyo (JP)

(72) Inventor: Shuichi Konami, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/524,198

(22) Filed: Oct. 27, 2014

(65) Prior Publication Data
US 2015/0128252 A1 May 7, 2015

(30) Foreign Application Priority Data
Nov. 6, 2013 (JP) .................................. 2013-230291

(51) Int. Cl.
| | |
|---|---|
| *G06F 21/32* | (2013.01) |
| *G06F 21/31* | (2013.01) |
| *H04L 29/06* | (2006.01) |
| *H04W 12/06* | (2009.01) |

(52) U.S. Cl.
CPC .............. *G06F 21/31* (2013.01); *G06F 21/32* (2013.01); *H04L 63/107* (2013.01); *H04L 63/205* (2013.01); *H04W 12/06* (2013.01); *G06F 2221/2115* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,483,450 | B1* | 7/2013 | Derakhshani ...... | G06K 9/00597 382/115 |
| 8,724,857 | B2* | 5/2014 | Derakhshani ...... | G06K 9/00597 382/117 |
| 2002/0067259 | A1* | 6/2002 | Fufidio .............. | G07C 9/00031 340/541 |
| 2005/0099492 | A1* | 5/2005 | Orr ...................... | H04L 12/1827 348/14.08 |
| 2006/0181521 | A1* | 8/2006 | Perreault ............... | G06F 1/1613 345/173 |
| 2006/0223469 | A1* | 10/2006 | Shibata .................. | H04H 40/18 455/226.1 |
| 2006/0239514 | A1* | 10/2006 | Watanabe .......... | G06K 9/00026 382/115 |
| 2007/0266447 | A1* | 11/2007 | Hollander ............... | G06F 21/32 726/34 |

(Continued)

FOREIGN PATENT DOCUMENTS

JP    2003-196566 A    7/2003

*Primary Examiner* — Taghi Arani
*Assistant Examiner* — Phy Anh Vu
(74) *Attorney, Agent, or Firm* — Chip Law Group

(57) ABSTRACT

There is provided an authentication control system including an acquisition unit configured to acquire information detected by a sensor, an evaluation unit configured to evaluate suitability for use of each of one or more sensors in environmental conditions indicated by the information, and an authentication mode selection unit configured to select an authentication mode from among a plurality of authentication modes based on an evaluation result obtained by the evaluation unit, each of the authentication modes using any one of the one or more sensors.

12 Claims, 12 Drawing Sheets

20

| TOUCH SENSOR | VOICE SENSOR | CAMERA SENSOR | MOTION SENSOR |
|---|---|---|---|
| 5 | 5 | 0 | 3 |

(56) References Cited

U.S. PATENT DOCUMENTS

| | | | | |
|---|---|---|---|---|
| 2008/0183536 | A1* | 7/2008 | Hirabayashi | G06Q 10/06 382/100 |
| 2009/0037978 | A1* | 2/2009 | Luque | G06F 21/32 726/2 |
| 2009/0222557 | A1* | 9/2009 | Rudy | G06F 17/30867 709/224 |
| 2010/0049278 | A1* | 2/2010 | Kuramori | A61B 5/0488 607/48 |
| 2013/0267204 | A1* | 10/2013 | Schultz | G06F 21/32 455/411 |
| 2015/0121514 | A1* | 4/2015 | Park | G06F 21/34 726/19 |
| 2016/0087952 | A1* | 3/2016 | Tartz | H04W 12/06 455/411 |

* cited by examiner

| TOUCH SENSOR | VOICE SENSOR | CAMERA SENSOR | MOTION SENSOR |
|---|---|---|---|
| 5 | 5 | 0 | 3 |

FIG. 5

| ACTION | PIN ENTRY AUTHENTICATION | VOICE AUTHENTICATION | CAMERA AUTHENTICATION | MOTION AUTHENTICATION |
|---|---|---|---|---|
| BEING IN CONCERT HALL | 10 | 0 | 0 | 0 |
| BEING PLACED ON TABLE OF HOUSE | 5 | 10 | 1 | 3 |
| DURING JOGGING | 5 | 8 | 8 | 10 |
| MOVING IN CAR (DURING DRIVING) | 1 | 8 | 10 | 1 |
| MOVING IN CAR (PASSENGER SEAT) | 5 | 8 | 10 | 3 |
| MOVING BY TRAIN | 5 | 3 | 8 | 3 |

FIG. 6

| PIN ENTRY AUTHENTICATION | VOICE AUTHENTICATION | CAMERA AUTHENTICATION | MOTION AUTHENTICATION |
|---|---|---|---|
| 25 | 40 | 0 | 9 |

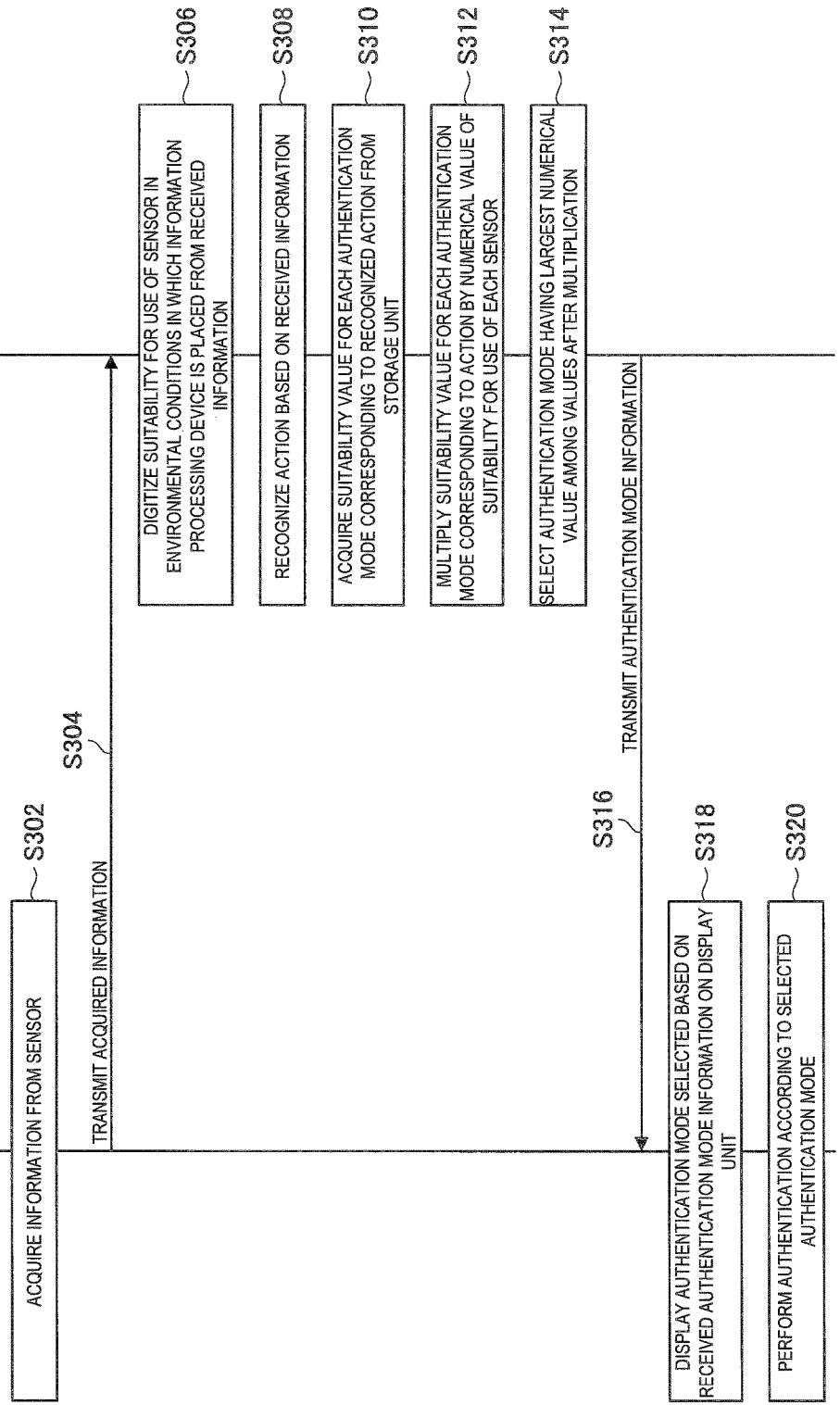

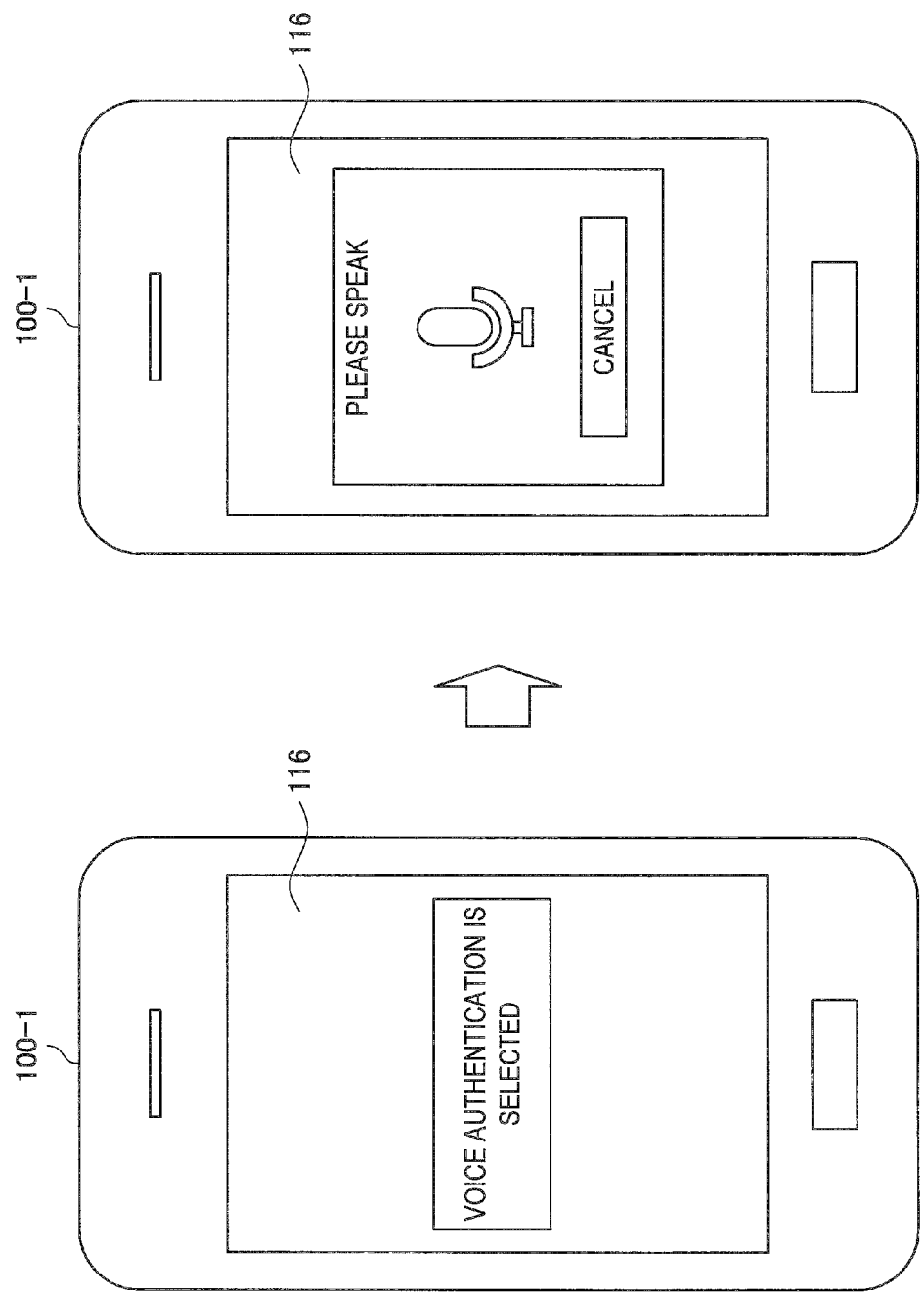

| ACTION | PIN ENTRY AUTHENTICATION | VOICE AUTHENTICATION | CAMERA AUTHENTICATION | MOTION AUTHENTICATION |
|---|---|---|---|---|
| BEING IN CONCERT HALL | 10 | 0 | 0 | 0 |
| BEING PLACED ON TABLE OF HOUSE | 5 | 10 | 1 | 3 |
| DURING JOGGING | 5 | 8 | 8 | 10 |
| MOVING IN CAR (DURING DRIVING) | 1 | 8 | 10 | 1 |
| MOVING IN CAR (PASSENGER SEAT) | 5 | 8 | 10 | 3 |
| MOVING BY TRAIN | 5 | 3 | 8 | 3 |

⇓

32

| ACTION | PIN ENTRY AUTHENTICATION | VOICE AUTHENTICATION | CAMERA AUTHENTICATION | MOTION AUTHENTICATION |
|---|---|---|---|---|
| BEING IN CONCERT HALL | 10 | 0 | 0 | 0 |
| BEING PLACED ON TABLE OF HOUSE | 5 | 10 | 1 | 3 |
| DURING JOGGING | 5 | 8 | 8 | 10 |
| MOVING IN CAR (DURING DRIVING) | 1 | 8 | 10 | 1 |
| MOVING IN CAR (PASSENGER SEAT) | 8 | 8 | 10 | 3 |
| MOVING BY TRAIN | 5 | 3 | 8 | 3 |

| ACTION | PIN ENTRY AUTHENTICATION | VOICE AUTHENTICATION | CAMERA AUTHENTICATION | MOTION AUTHENTICATION |
|---|---|---|---|---|
| BEING IN CONCERT HALL | 10 | 0 | 0 | 0 |
| BEING PLACED ON TABLE OF HOUSE | 5 | 10 | 1 | 3 |
| DURING JOGGING | 5 | 8 | 8 | 10 |
| MOVING IN CAR (DURING DRIVING) | 1 | 8 | 10 | 1 |
| MOVING IN CAR (PASSENGER SEAT) | 5 | 8 | 10 | 3 |
| MOVING BY TRAIN | 5 | 3 | 8 | 3 |

32

| ACTION | PIN ENTRY AUTHENTICATION | VOICE AUTHENTICATION | CAMERA AUTHENTICATION | MOTION AUTHENTICATION |
|---|---|---|---|---|
| BEING IN CONCERT HALL | 10 | 0 | 0 | 0 |
| BEING IN CONCERT HALL (PRESENCE OF MOTION) | 5 | 0 | 0 | 8 |
| BEING PLACED ON TABLE OF HOUSE | 5 | 10 | 1 | 3 |
| DURING JOGGING | 5 | 8 | 8 | 10 |
| MOVING IN CAR (DURING DRIVING) | 1 | 8 | 10 | 1 |
| MOVING IN CAR (PASSENGER SEAT) | 6 | 8 | 10 | 3 |
| MOVING BY TRAIN | 5 | 3 | 8 | 3 |

AUTHENTICATION CONTROL SYSTEM, AUTHENTICATION CONTROL METHOD, AND PROGRAM

CROSS REFERENCE TO RELATED APPLICATIONS

This application claims the benefit of Japanese Priority Patent Application JP 2013-230291 filed Nov. 6, 2013, the entire contents of which are incorporated herein by reference.

BACKGROUND

The present disclosure relates to an authentication control system, an authentication control method, and a program.

The installation of a user authentication function to a mobile terminal such as smartphones from the viewpoint of information protection is now in widespread use. However, use of a plurality of authentication modes for security enhancement may often complicate the operation of authentication by a user.

In this regard, JP 2003-196566A discloses a technology for registering a location and time zone at which a user is authenticated as an activity pattern and simplifying the processing of user authentication when the location and time zone of the user corresponds to the registered activity pattern.

SUMMARY

However, in the technology disclosed in JP 2003-196566A, the activity pattern is determined based on the location and time zone, resulting in making it difficult to provide an authentication mode suitable for environmental conditions in which a terminal is actually placed.

Therefore, according to an embodiment of the present disclosure, there is provided a novel and improved authentication control system, authentication control method, and program, capable of selecting automatically an authentication mode that uses a sensor suitable for environmental conditions in which a terminal is placed.

According to an embodiment of the present disclosure, there is provided an authentication control system including an acquisition unit configured to acquire information detected by a sensor, an evaluation unit configured to evaluate suitability for use of each of one or more sensors in environmental conditions indicated by the information, and an authentication mode selection unit configured to select an authentication mode from among a plurality of authentication modes based on an evaluation result obtained by the evaluation unit, each of the authentication modes using any one of the one or more sensors.

According to another embodiment of the present disclosure, there is provided an authentication control method including acquiring information detected by a sensor, evaluating suitability for use of each of one or more sensors in environmental conditions indicated by the information, and selecting an authentication mode from among a plurality of authentication modes based on an evaluation result, each of the authentication modes using any one of the one or more sensors.

According to another embodiment of the present disclosure, there is provided a program for causing a computer to execute an acquisition function of acquiring information detected by a sensor, an evaluation function of evaluating suitability for use of each of one or more sensors in environmental conditions indicated by the information, and an authentication mode selection function of selecting an authentication mode from among a plurality of authentication modes based on an evaluation result obtained by the evaluation function, each of the authentication modes using any one of the one or more sensors.

According to one or more of embodiments of the present disclosure described above, there is provided an authentication control system, an authentication control method, and a program, capable of selecting automatically an authentication mode that uses a sensor suitable for the environmental conditions in which a terminal is placed.

Note that the advantages described above are not necessarily intended to be restrictive, and any other advantages described herein and other advantages that will be understood from the present disclosure may be achievable, in addition to or as an alternative to the advantages described above.

BRIEF DESCRIPTION OF THE DRAWINGS

FIG. 5 is a diagram illustrating an example of a suitability value of each authentication mode associated with each action in the authentication control system according to the first embodiment of the present disclosure;

FIG. 6 is a diagram illustrating an exemplary result, which is represented as a numerical value, obtained by multiplying a suitability value of an authentication mode associated with an action by the suitability of use of a sensor in the authentication control system according to the first embodiment of the present disclosure;

FIG. 7 is a sequence diagram illustrating schematically the processing by the authentication control system in the first embodiment of the present disclosure;

FIG. 8 is a diagram illustrating an exemplary display of a display unit of an information processing device in the authentication control system according to the first embodiment of the present disclosure;

FIG. 9 is a diagram showing an example of a change in suitability values in a table of authentication mode suitability values in an authentication control system according to a first modification of the first embodiment of the present disclosure;

FIG. 10 is a diagram illustrating an example of adding an action to the table of authentication mode suitability values in the authentication control system according to a second modification of the first embodiment of the present disclosure;

DETAILED DESCRIPTION OF THE EMBODIMENT(S)

Figure 1:
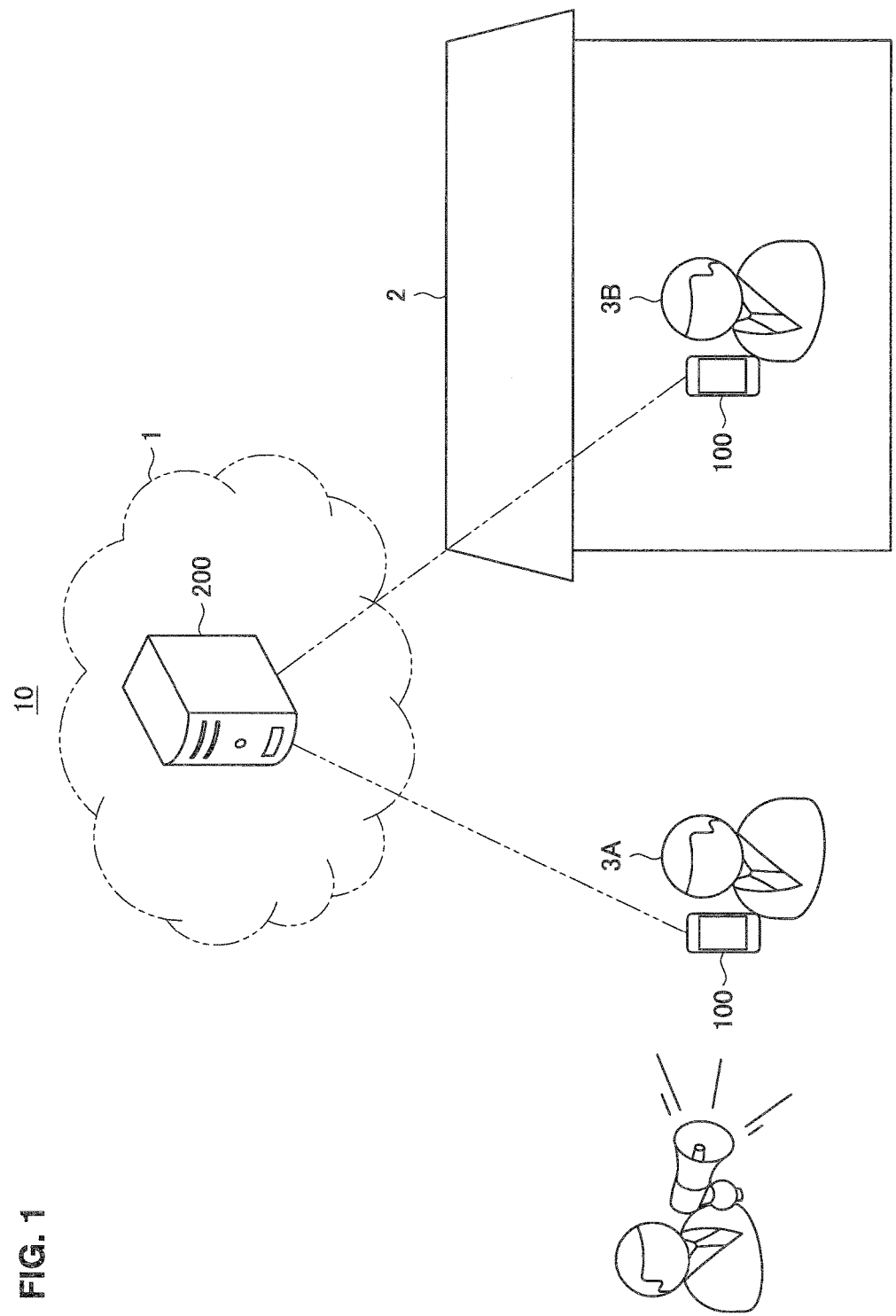
FIG. 1 is a diagram for describing an overview of an authentication control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:
1. Overview of Authentication Control System
2. First Embodiment of the Present Disclosure
2-1. Configuration of Authentication Control System according to First Embodiment of the Present Disclosure
2-2. Processing in Authentication Control System according to First Embodiment of the Present Disclosure
2-3. Modification of First Embodiment of the Present Disclosure
3. Second Embodiment of the Present Disclosure
3-1. Configuration of Information Processing Device according to Second Embodiment of the Present Disclosure
3-2. Processing in Information Processing Device according to Second Embodiment of the Present Disclosure
3-3. Modification of Second Embodiment of the Present Disclosure
4. Hardware Configuration according to an Embodiment of the Present Disclosure
5. Conclusion

1. Overview of Authentication Control System

Referring now to FIG. 1, an overview of an authentication control system according to an embodiment of the present disclosure is described. FIG. 1 is a diagram for describing an overview of an authentication control system according to an embodiment of the present disclosure.

The authentication control system 10 includes an information processing device 100 and an authentication control device 200. The information processing device 100 is a portable mobile communication terminal that is carried by the user, and the authentication control device 200 is a server that performs cloud services or the like installed in a network 1. Thus, the information processing device 100 and the authentication control device 200 can communicate with each other via a network such as the Internet.

The information processing device 100 includes a sensor and has a function to perform authentication using the sensor. The authentication control device 200 has a function to recognize an action of the user of the information processing device 100 based on sensor information and to select an authentication mode that is suitable for the recognized action. Thus, in the authentication control system 10, the information processing device 100 can transmit sensor information to the authentication control device 200. Then, the authentication control device 200 can recognize the user's action based on the received sensor information and can select an authentication mode based on the recognized action. Then, the authentication control device 200 transmits information regarding the selected authentication mode to the information processing device 100, and the information processing device 100 performs authentication based on the information received regarding the selected authentication mode. A technology that recognizes the user's action based on sensor information is disclosed in documents including JP 5028751B and JP 2010-198595A.

In some cases, a selected authentication mode is not suitable depending on the environmental conditions in which a terminal is placed. For example, as illustrated in the lower left side of FIG. 1, when a user 3A who holds the information processing device 100 is walking in a noisy place, it is recognized that the user 3A is walking based on information obtained by an acceleration sensor or the like, and voice authentication that is easier to be operated during walking than other authentication modes may be selected. However, accuracy of a voice sensor may be low due to ambient noise, and thus authentication is more likely to fail than to succeed. Thus, in the authentication control system 10 according to an embodiment of the present disclosure, the authentication control device 200 evaluates suitability for use of a sensor based on sensor information received from the information processing device 100 and selects an authentication mode based on a result obtained by evaluation and a recognized action.

For example, in the above-described example, the information processing device 100 acquires ambient sounds by a voice sensor and transmits the acquired voice information to the authentication control device 200. The authentication control device 200 determines that suitability for use of the voice sensor is low based on the received voice information because there are many sounds that may be noise around the information processing device 100, and thus, for example, authentication control device 200 selects camera authentication using a camera sensor. The information processing device 100 then receives the fact that the camera authentication is selected and presents the camera authentication to the user.

As illustrated in the lower right side of FIG. 1, when a user 3B who holds the information processing device 100 remains stationary in a house 2 with little noise, the authentication control device 200 determines that suitability for use of the voice sensor is high based on the received voice information because there are a few sounds that may be noise around the information processing device 100, and thus it selects voice authentication. The information processing device 100 then receives the fact that the voice authentication is selected and presents the voice authentication to the user.

In this way, the authentication control system 10 according to an embodiment of the present disclosure evaluates the suitability for use of a sensor from information detected by the sensor included in the information processing device 100 and selects an authentication mode from among a plurality of authentication modes using a sensor based on the evaluation result. Thus, it is possible to select automatically an authentication mode using a sensor suitable for the environmental conditions in which the information processing device 100 is placed. Although an example in which the authentication control device 200 is installed in a network of cloud services has been described, the authentication control device 200 may be a portable terminal that communicates directly with the information processing device 100. In addition, although FIG. 1 illustrates a smartphone as an example of the information processing device 100, the information processing device 100 may include tablet terminals, portable game consoles, and personal digital assistants (PDAs). For convenience of description, the information processing devices 100 according to the first and second embodiments are distinguished from each other in such a way that the component is labeled with a reference numeral corresponding to each embodiment, such as information processing device 100-1 and information processing device 100-2.

2. First Embodiment of the Present Disclosure

[2-1. Configuration of Authentication Control System According to First Embodiment of the Present Disclosure]

Figure 2:
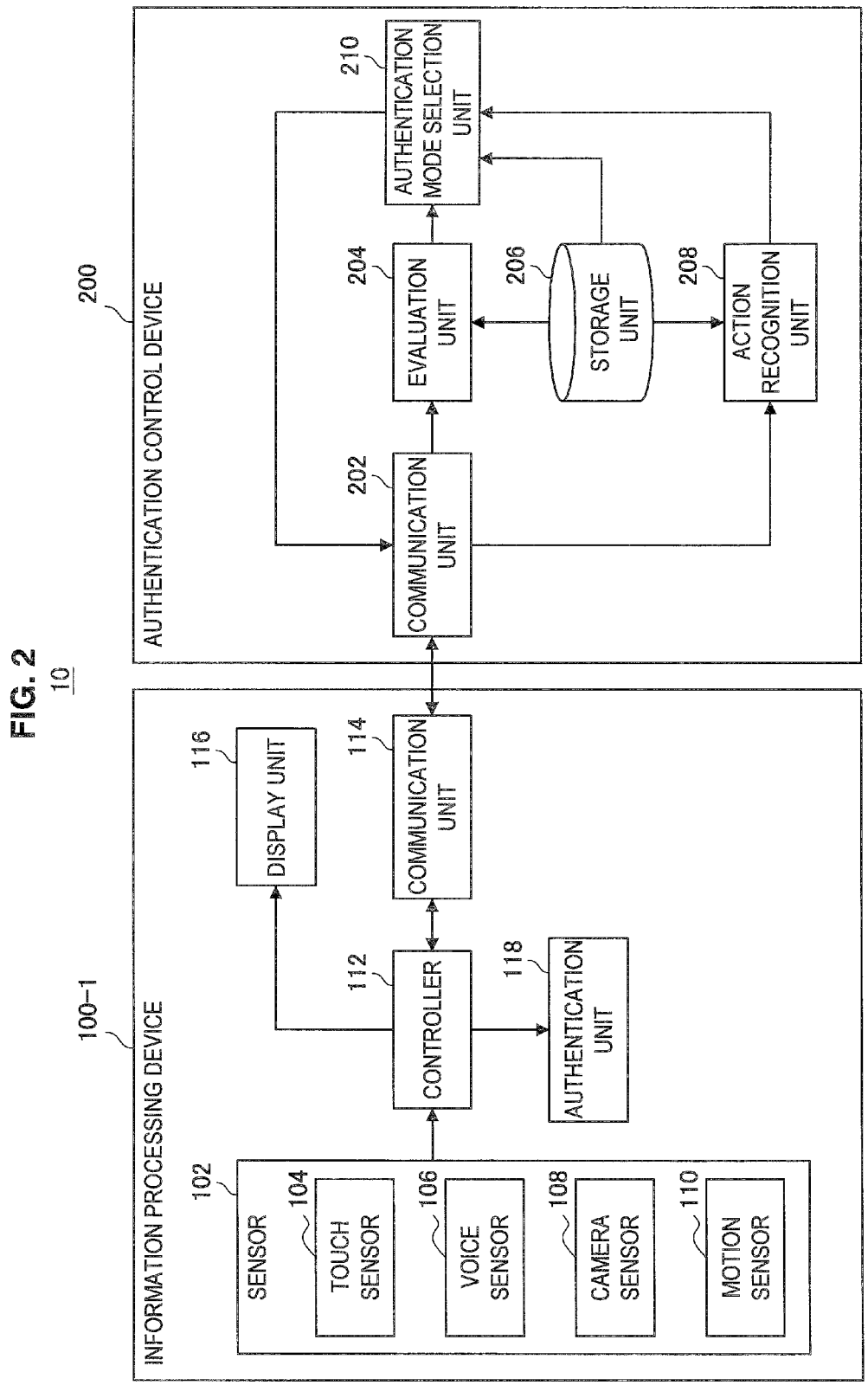
FIG. 2 is a schematic block diagram illustrating the functional configuration of an authentication control system according to a first embodiment of the present disclosure.

The overview of the authentication control system 10 according to an embodiment of the present disclosure has been described. Referring now to FIG. 2, the configuration of the authentication control system 10 according to the first embodiment of the present disclosure is described. FIG. 2 is a schematic block diagram illustrating the functional configuration of the authentication control system 10 according to the first embodiment of the present disclosure.

As illustrated in FIG. 2, the authentication control system 10 includes an information processing device 100-1 and the authentication control device 200.

(Configuration of Information Processing Device 100-1)

The information processing device 100-1 is configured to include a sensor 102, a controller 112, a communication unit 114, a display unit 116, and an authentication unit 118. The sensor 102 is configured to include a touch sensor 104, a voice sensor 106, a camera sensor 108, and a motion sensor 110.

The touch sensor 104 detects an operation on a touch panel. In addition, information that is detected in a state where an operation on a touch panel is not performed is used as noise of the touch sensor 104. For example, the touch sensor 104 may be an electrostatic capacity type, resistive film type, or the like.

The voice sensor 106 detects sounds around the information processing device 100-1. Specifically, the voice sensor 106 detects voices by converting vibration caused by sound waves generated around the information processing device 100-1 into an electrical signal. For example, the voice sensor 106 may be a microphone or the like of an electrodynamic or electrostatic type.

The camera sensor 108 detects brightness around the information processing device 100-1. For example, the camera sensor 108 is a sensor that uses a photodiode or the like and can detect the brightness based on the quantity of electric charge accumulated in a photodiode or the like by incident light.

The motion sensor 110 detects motion of the information processing device 100-1. Specifically, the motion sensor 110 detects the movement, orientation, or the like of the information processing device 100-1. For example, the motion sensor 110 may include an acceleration sensor, an angular velocity sensor, or a geomagnetic sensor.

Each of the sensors provided in the sensor 102 performs detection operation when a user performs an authentication start operation.

The controller 112 controls the communication unit 114, the display unit 116, and the authentication unit 118. Specifically, the controller 112 acquires sensor information from the sensor 102 and allows the communication unit 114 to transmit the acquired sensor information. In addition, the controller 112 controls the display unit 116 to display and allows the authentication unit 118 to perform authentication, based on authentication mode information received by the communication unit 114. The authentication mode information contains information that indicates a selected authentication mode. In addition, the information processing device 100-1 may further include a GPS module, and the controller 112 may allow the communication unit 114 to transmit position information obtained from the GPS module together with sensor information.

The communication unit 114 communicates with the authentication control device 200. Specifically, the communication unit 114 transmits sensor information to the authentication control device 200 and receives authentication mode information from the authentication control device 200. For example, the communication unit 114 can communicate with the authentication control device 200 directly, or indirectly via a base station or an access point, using wired communication, Bluetooth (registered trademark) communication, Wi-Fi (registered trademark) communication, or mobile phone communication.

The display unit 116 displays the selected authentication mode. Specifically, the display unit 116 displays an image that indicates the selected authentication mode under an instruction of the controller 112.

The authentication unit 118 performs authentication in accordance with the selected authentication mode. Specifically, the authentication unit 118 performs personal identification number (PIN) entry authentication, voice authentication, camera authentication, or motion authentication, under an instruction of the controller 112. In the PIN entry authentication, for example, the authentication may be performed using a predetermined code previously set and a code entered through a touch panel. In the voice authentication, for example, the authentication may be performed using voice data previously set and voice data inputted through a voice sensor. In the camera authentication, for example, the authentication may be performed using an image previously set and an image obtained through capturing by a camera. In the motion authentication, for example, the authentication may be performed using a trajectory previously set and a trajectory of the information processing device 100-1 that is specified through information obtained from an acceleration sensor, an angular velocity sensor, or the like. Authentication modes other than the above may be used.

(Configuration of Authentication Control Device 200)

The authentication control device 200 is configured to include a communication unit 202, an evaluation unit 204, a storage unit 206, an action recognition unit 208, and an authentication mode selection unit 210.

The communication unit 202 communicates with the information processing device 100-1. Specifically, the communication unit 202 receives sensor information from the information processing device 100-1 and transmits authentication mode information to the information processing device 100-1.

Figures 3, 4:
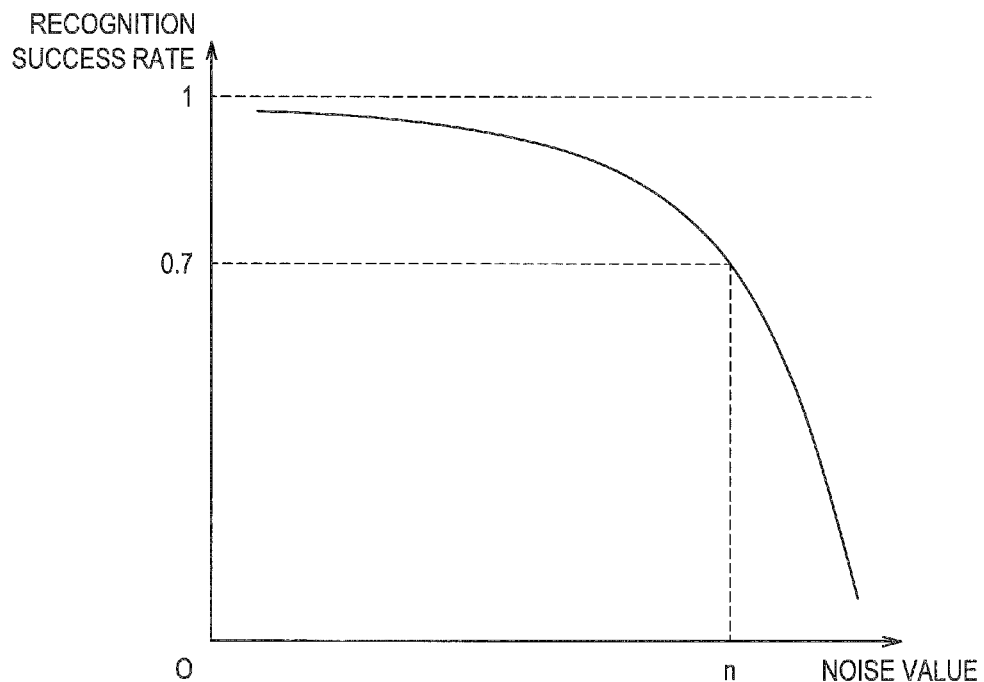
FIG. 3 is a graph illustrating an example of a function that indicates the relationship between the noise values and recognition success rate of a voice sensor in the authentication control system according to the first embodiment of the present disclosure.
FIG. 4 is a diagram illustrating an example of evaluation results obtained by evaluating suitability for use of a sensor in the authentication control system according to the first embodiment of the present disclosure.

The evaluation unit 204 evaluates suitability for use of one or more sensors based on sensor information. Specifically, the evaluation unit 204 digitizes the suitability for use of one or more sensors in the environmental conditions indicated by the sensor information based on the corresponding relation between sensor information received by the communication unit 202 from the information processing device 100-1 and accuracy of the sensor. The detailed description thereof is given with reference to FIG. 3. FIG. 3 is a graph illustrating an example of a function indicating the relationship between a noise value and recognition success rate of the voice sensor 106 in the authentication control system 10 according to the first embodiment of the present disclosure.

The evaluation unit 204 identifies the environmental conditions in which the information processing device 100 for each of one or more sensors based on sensor information and acquires accuracy of a sensor corresponding to the identified environmental conditions. For example, as illustrated in FIG. 3, the evaluation unit 204 may extract a noise value n from sensor information of the voice sensor 106 to identify noise conditions around the information processing device 100. The evaluation unit 204 then may acquire a recognition success rate "0.7" of the voice sensor 106 that corresponds to the noise value "n", by using a function that indicates the relationship between the noise value and recognition success rate, which is stored in the storage unit 206.

Then, the evaluation unit 204 digitizes the acquired sensor accuracy. Specifically, the description thereof is given with reference to FIG. 4. FIG. 4 is a diagram illustrating an example of results obtained by evaluating suitability for use of a sensor in the authentication control system 10 according to the first embodiment of the present disclosure. For example, as shown in a table 20 of FIG. 20, the evaluation unit 204 can digitize the acquired accuracy for each of the touch sensor 104, the voice sensor 106, the camera sensor 108, and the motion sensor 110. Furthermore, the evaluation unit 204 can digitize so that a numerical value becomes larger as the sensor accuracy increases. For example, the table 20 of FIG. 4 shows that accuracy of the touch sensor and the voice sensor is relatively high, compared to that of the camera sensor and the motion sensor.

Although an example in which the evaluation unit 204 evaluates suitability for use of all of the sensors from which sensor information is acquired has been described, the evaluation unit 204 may evaluate only a part of the sensors from which sensor information is acquired. For example, when any one of PIN entry authentication and camera authentication can be selected, the evaluation unit 204 evaluates only suitability for use of the camera sensor, and if the suitability for use has a value that is less than or equal to a predetermined value, then the authentication mode selection unit 210 described later selects the PIN entry authentication. Thus, the evaluation process procedures of the evaluation unit 204 can be reduced, thereby improving the processing speed of the authentication control device 200.

Furthermore, although an example in which the evaluation unit 204 acquires accuracy of a sensor from sensor information and digitizes the acquired sensor accuracy has been described, the evaluation unit 204 may perform direct digitization of sensor information. For example, the suitability value for use corresponding to sensor information is stored in the storage unit 206 as a table, and the evaluation unit 204 may acquire the suitability value for use by referencing the table based on the received sensor information. Thus, the evaluation process procedures of the evaluation unit 204 can be reduced, thereby improving the processing speed of the authentication control device 200.

Moreover, although an example in which the evaluation unit 204 evaluates suitability for use of the voice sensor 106 has been described, an example of evaluating suitability for use of the touch sensor 104, the camera sensor 108, and the motion sensor 110 will be described below.

The evaluation unit 204 evaluates suitability for use of a touch sensor 104 based on the information, which is detected in a state in which a touch panel operation is not performed, obtained from the touch sensor 104. For example, if dirt adheres to some of a plurality of touch sensors 104 provided on a touch panel, the touch sensors 104 to which dirt adheres may detect their contact in a state in which a touch panel operation is not performed. The evaluation unit 204 then may evaluate suitability for use of a target sensor based on the number of sensors that detect the contact, intensity of the detected contact, the position at which the contact is detected, and so on, which are contained in the contact information obtained from the touch sensor 104. For example, if the proportion of the number of sensors to which dirt adheres to the total number of sensors is greater than a predetermined proportion, it is considered that the detection accuracy of the touch sensor 104 decreases, and thus the evaluation unit 204 may evaluate that suitability for use of the touch sensor 104 is low.

The evaluation unit 204 evaluates suitability for use of the camera sensor 108 based on the brightness information obtained from the camera sensor 108. For example, the camera sensor 108 is a sensor that uses a photodiode or the like and can detect the brightness based on the quantity of electric charge accumulated in a photodiode or the like by incident light. The evaluation unit 204 may evaluate suitability for use of a target sensor based on the threshold in the saturation signal amount and quantity of the detected electric charge of the camera sensor 108. For example, if it is detected that the quantity of electric charge having a value close to the saturation signal amount of the camera sensor 108, for example, the electric charge more than 90% of the saturation signal amount is accumulated, it is considered that the brightness around the information processing device 100-1 exceeds the capability of the camera sensor and the detection accuracy of the camera sensor 108 decreases, so the evaluation unit 204 may evaluate that suitability for use of the camera sensor 108 is low.

The evaluation unit 204 evaluates suitability for use of the motion sensor 110 based on a motion of the information processing device 100-1 obtained from the motion sensor 110. For example, the motion sensor 110 may be an acceleration sensor and can detect movement of the information processing device 100-1. The evaluation unit 204 evaluates suitability for use of a target sensor, for example, based on the speed, direction, and frequency of change in direction of movement detected. For example, if the frequency of change in direction of movement is high, it is considered that the information processing device 100-1 is moved inch by inch and the detection accuracy of the motion sensor 110 decreases, so the evaluation unit 204 may evaluate that suitability for use of the motion sensor 118 is low.

Returning to the description of the configuration of the authentication control device 200 with reference to FIG. 2, the storage unit 206 stores the suitability of an authentication mode for each of the user's action. Specifically, the storage unit 206 stores the suitability of an authentication mode for each of the action recognized by the action recognition unit 208, which will be described later, as a numerical value. The detailed description thereof is given with reference to FIG. 5. FIG. 5 is a diagram illustrating an example of a suitability value of an authentication mode for each action in the authentication control system 10 according to the first embodiment of the present disclosure.

For example, as illustrated in FIG. 5, the storage unit 106 may store the suitability value of an authentication mode in a table form in which each action recognized by the action recognition unit 208 corresponds to each authentication mode. For example, the storage unit 206 may store the numerical values of "10" for PIN entry authentication, "0" for voice authentication, "0" for camera authentication, and "0" for motion authentication with respect to the action of "being in a concert hall".

Returning to the description of the configuration of the authentication control device 200 with reference to FIG. 2, the action authentication unit 208 recognizes the user's action based on sensor information. Specifically, the action recognition unit 208 recognizes the user's action by using the technology disclosed in the above-mentioned patent document. The action that is recognized includes, for example, actions of "being in a concert hall", "being placed on a table of a house", "during jogging", and so on, as illustrated in FIG. 5.

Returning to the description of the configuration of the authentication control device 200 with reference to FIG. 2, the authentication mode selection unit 210 selects an authentication mode based on the evaluation result obtained by the evaluation unit 204 and the action recognized by the action recognition unit 208. Specifically, the authentication mode selection unit 210 acquires the suitability value of each of the authentication modes corresponding to the action recognized by the action recognition unit 208 from the storage unit 206 and multiplies the acquired suitability value by the suitability for use of each of the sensors obtained by evaluation of the evaluation unit 204. The authentication mode selection unit 210 then selects an authentication mode having the largest numerical value from among results obtained by the multiplication. The detailed description thereof is given with reference FIGS. 4 to 6. FIG. 6 is a diagram illustrating an example of a numerical value of the results obtained by the multiplication of the suitability value of an authentication mode corresponding to an action by the suitability for use of a sensor in the authentication control system 10 according to the first embodiment of the present disclosure.

The authentication mode selection unit 210 acquires the suitability value of each of the authentication modes corresponding to the action recognized by the action recognition unit 208. For example, as illustrated in FIG. 5, if the action recognition unit 208 recognizes the action of "moving in a car (passenger seat)", the authentication mode selection unit 210 acquires numerical values of "5" for PIN entry authentication, "8" for voice authentication, "10" for camera authentication, and "3" for motion authentication, from the table of authentication mode suitability values stored in the storage unit 206.

The authentication mode selection unit 210 then multiplies the suitability value of each authentication mode using a sensor by the suitability for use of each sensor obtained by evaluation of the evaluation unit 204. For example, as illustrated in FIG. 4, the authentication mode selection unit 210 can acquire numerical values of "5" for the touch sensor, "5" for the voice sensor, "0" for the camera sensor, and "3" for the motion sensor by evaluation of the evaluation unit 204.

The authentication mode selection unit 210 can multiply the suitability value of PIN entry authentication using the touch sensor by the suitability for use of the touch sensor and can multiply the suitability value of voice authentication using a voice sensor by the suitability for use of the voice sensor. In addition, the authentication mode selection unit 210 can multiply the suitability value of camera authentication using a camera sensor by the suitability for use of the camera sensor and can multiply the suitability value of voice authentication using a motion sensor by the suitability for use of the motion sensor.

Then, the authentication mode selection unit 210 selects an authentication mode having the largest numerical value from among results obtained by multiplying each of suitability values of an authentication mode by each of the suitability for use of a sensor. For example, as illustrated in FIG. 6, the authentication mode selection unit 210 can select a voice authentication having the largest numerical value to use from among results obtained by multiplication as an authentication mode.

Although an example in which the suitability value of one authentication mode is multiplied by the suitability value for use of one sensor to be used in the authentication mode has been described, if there are a plurality of sensors are used for one authentication mode, then the suitability value of the authentication mode may be multiplied by the suitability values for use of two or more sensors among sensors to be used for the authentication mode. For example, the camera sensor 108 can be used for the image capturing to perform camera authentication and the motion sensor 110 can be used for the correction of camera shake or the like at the time of image capturing. In this case, the authentication mode selection unit 210 can multiply the suitability value of camera authentication by the numerical value obtained by performing proportional division and addition of the suitability value for use of the camera sensor 108 and the suitability value for use of the motion sensor 110. For example, if the suitability value for use of the camera sensor 108 is "5" and the suitability value for use of the motion sensor 110 is "3", then the suitability values for use of the camera sensor 108 and the motion sensor 110 are each divided proportionally by 50% to produce the values of "2.5" and "1.5". The value of "4" that is obtained by adding numerical values obtained by performing a proportional division to each other is used for multiplication of the suitability value of camera authentication.

Furthermore, for example, a plurality of types of motion sensors 110 may be used to perform motion authentication. For example, an angular velocity sensor or the like can be used to identify the direction of the information processing device 100-1, and an acceleration sensor or the like can be used to identify the moving speed of the information processing device 100-1. In this case, the authentication mode selection unit 210 can multiply the suitability value of motion authentication by the numerical value obtained by dividing proportionally and adding the suitability values for use of the angular velocity sensor and the acceleration sensor.

In this way, when a plurality of sensors are used for one authentication mode, the suitability value for use of two or more sensors can be multiplied by the suitability value of one authentication mode, thereby selecting an authentication mode having higher suitability.

2-2. Processing in Authentication Control System According to First Embodiment of the Present Disclosure Referring now to FIG. 7, the processing in the authentication control system 10 according to the first embodiment of the present disclosure is described. FIG. 7 is a sequence diagram illustrating schematically the processing in the authentication control system 10 according to the first embodiment of the present disclosure. The description overlapping with the description of the configuration of the authentication control system 10 will be omitted.

In the information processing device 100-1, if an authentication start operation is perform by a user, then the controller 112 acquires information from the sensor 102 (step S302). Specifically, if the sensor 102 detects the authentication start operation of the user, then the controller 112 acquires sensor information from the sensor 102. For example, if the touch sensor 104 detects a contact on a touch panel, then the controller 112 can acquire sensor information of each sensor from the sensor 102.

Then, the communication unit 114 transmits the acquired information (step S304). Specifically, the controller 112 allows the communication unit 114 to transmit the acquired sensor information to the authentication control device 200.

Then, in the authentication control device 200, the evaluation unit 204 digitizes the suitability for use of a sensor in the environmental conditions in which the information processing device 100-1 is placed from the received information (step S306). Specifically, the communication unit 202 receives sensor information from the communication unit 114 of the information processing device 100-1, and the evaluation unit 204 digitizes the suitability for use of a sensor based on the received sensor information.

Then, the action recognition unit 208 recognizes an action based on the received information (step S308). Specifically, the action recognition unit 208 recognizes an action based on the sensor information received by the communication unit 202.

Then, the authentication mode selection unit 210 acquires a suitability value for each authentication mode corresponding to the recognized action from the storage unit 206 (step S310).

Then, the authentication mode selection unit 210 multiplies a suitability value for each authentication mode corresponding to the action by the suitability value for use of each sensor (step S312).

Then, the authentication mode selection unit 210 selects an authentication mode having the largest numerical value among values obtained by the multiplication (step S314).

Then, the communication unit 202 transmits authentication mode information (step S316). Specifically, the communication unit 202 transmits information regarding an authentication mode selected by the authentication mode selection unit 210 to the communication unit 114 of the information processing device 100-1.

Then, in the information processing device 100-1, the display unit 116 displays the authentication mode selected that is based on the received authentication mode information (step S318). Specifically, the controller 112 allows the display unit 116 to display an image indicating the selected authentication mode and an image associated with authentication, based on the authentication mode information received by the communication unit 114 from the authentication control device 200. For example, the description is given with reference to FIG. 8. FIG. 8 is a diagram illustrating an exemplary display of the display unit of the information processing device 100-1 in the authentication control system 10 according to the first embodiment of the present disclosure.

For example, as illustrated in the left view of FIG. 8, the controller 112 recognizes that voice authentication is selected from the authentication mode information and allows the display unit 116 to display an image indicating that the voice authentication is selected. Furthermore, as illustrated in the right view of FIG. 8, the display unit 116 displays an image indicating that the voice authentication is selected and then may display an image related to the voice authentication.

Returning to the description of the processing in the authentication control system 10 with reference to FIG. 7, then the authentication unit 118 performs authentication in accordance with the selected authentication mode (step S320). Specifically, the controller 112 allows the authentication unit 118 to perform authentication in accordance with the selected authentication mode, based on the authentication mode information received by the communication unit 114 from the authentication control device 200.

As described above, according to the first embodiment of the present disclosure, the authentication control device 200 acquires sensor information from the information processing device 100-1 provided with a sensor and evaluates the suitability for use of each of one or more sensors in the environmental conditions indicated by the acquired sensor information. The authentication control device 200 selects an authentication mode from among a plurality of authentication modes using a sensor based on the results obtained by evaluating the suitability for use of the sensor and an action recognized using the sensor information, and transmits the authentication mode information to the information processing device 100-1. In this way, the evaluation of the suitability for use of a sensor in the environmental conditions indicated by the sensor information makes it possible to select automatically an authentication mode that uses a sensor suitable for the environmental conditions in which the information processing device 100-1 is placed. In addition, the authentication control device 200 performs the authentication mode selection process, which leads to the power saving of the information processing device 100-1 and the reduction in computational resources.

Although, in the first embodiment, there has been described an example in which the authentication mode selection unit 210 selects an authentication mode based on the numerical evaluation results and the numerical value corresponding to an action stored in the storage unit 206, the information to be used to allow the authentication mode selection unit 210 to perform the selection process is not limited to numerical values. For example, the evaluation unit 204 evaluates based on whether the result obtained by evaluating the suitability for use of a sensor is either available or unavailable, and the storage unit 206 may store the suitability for use of each authentication mode corresponding to an action as either available or unavailable. The authentication mode selection unit 210 may select an authentication mode in which at least one of the suitability for use of a sensor and the suitability for use of an authentication mode is available.

2-3. Modification of First Embodiment of the Present Disclosure

The first embodiment of the present disclosure has been described. The present embodiment is not limited to the examples described above. The first and second modifications of the present embodiment are described below.

(First Modification)

The first modification of the present embodiment is described. When an authentication mode other than that selected by the authentication mode selection unit 210 is used, the authentication mode selection unit 210 may change the suitability value of each authentication mode corresponding to the action stored in the storage unit 206 so that the authentication mode that is used is more likely to be selected. The detailed description thereof is given with reference to FIG. 9. FIG. 9 is a diagram illustrating an example of a change in suitability values in a table of authentication mode suitability values in the authentication control system 10 according to the first modification of the first embodiment of the present disclosure.

When the authentication is performed using an authentication mode other than that selected by the authentication mode selection unit 210, the controller 112 notifies the authentication mode used for authentication to the authentication mode selection unit 210 through the communication. For example, when the authentication mode selection unit 210 selects voice authentication and the user selects not voice authentication but PIN entry authentication, the controller 112 notifies the fact that PIN entry authentication is performed to the authentication mode selection unit 210 through the communication between the communication unit 114 and the communication unit 202.

Then, the authentication mode selection unit 210 increases the suitability value of an authentication mode stored in the storage unit 206, which corresponds to the action when the authentication mode has been selected and is notified from the controller 112. For example, as illustrated in the upper view of FIG. 9, in a table 30 of authentication mode suitability values stored in the storage unit 206, the suitability value of the PIN entry authentication corresponding to the action of "moving in a car (passenger seat)" is set to the numeric value of 5, while the authentication mode selection unit 210 increases the suitability value thereof to the numeric value of 6 and then updates the table 30 into a table 32 of authentication mode suitability values as illustrated in the lower view of FIG. 9.

As described above, when an authentication mode other than that selected by the authentication mode selection unit 210 is used, the authentication mode selection unit 210 changes the suitability value of each authentication mode corresponding to an action stored in the storage unit 206 so that the authentication mode that is used is more likely to be selected. In this way, the authentication mode that is used is likely to be selected, and thus it is possible to select automatically an authentication mode suitable for the user's preference.

(Second Modification)

The second modification of the present embodiment is described. When an authentication mode other than that selected by the authentication mode selection unit 210 is used, the authentication mode selection unit 210 may allow the storage unit 206 to store a suitability value corresponding to an action that is added based on the action recognized by the action recognition unit 208 in association with each of the authentication modes. The detailed description is given with reference to FIG. 10. FIG. 10 is a diagram illustrating an example of adding an action to a table of an authentication mode suitability values in the authentication control system 10 according to the second modification of the first embodiment of the present disclosure.

When the authentication is performed using an authentication mode other than that selected by the authentication mode selection unit 210, the controller 112 notifies the authentication mode used for authentication to the authentication mode selection unit 210 through the communication. For example, when the authentication mode selection unit 210 selects PIN entry authentication and the user selects not PIN entry authentication but motion authentication, the controller 112 notifies the fact that the motion authentication is performed to the authentication mode selection unit 210 through the communication between the communication unit 114 and the communication unit 202.

Then, the authentication mode selection unit 210 adds a new action based on the action recognized by the action recognition unit 208 to the table of authentication mode suitability values stored in the storage unit 206. Then, the authentication mode selection unit 210 sets a suitability value of each authentication mode corresponding to the newly added action, based on a value of the action based on when the new action is added. For example, as illustrated in FIG. 10, when the action recognition unit 208 recognizes the action of "being in a concert hall", the authentication mode selection unit 210 adds a new action of "being in a concert hall (presence of motion)" based on the recognized action to the table 30 of authentication mode suitability values. As the suitability value of each authentication mode corresponding to the action that is newly added, the authentication mode selection unit 210 may set the authentication mode that has been not used to have a numerical value lower than the action of "being in a concert hall" based on when a new action is added. For example, as illustrated in the lower view of FIG. 10, the PIN entry authentication having the suitability value of 10 in the action based on when a new action has been added may be set to the numerical value of "5".

In addition, the authentication mode selection unit 210 may set so that the numerical value of the authentication mode that is used is higher than the numerical value that is set in the authentication mode that has been not used. For example, as illustrated in the lower view of FIG. 10, the PIN entry authentication that has been not used is set to "5", while the motion authentication that is used may be set to "8".

As described above, when an authentication mode other than that selected by the authentication mode selection unit 210 is used, the authentication mode selection unit 210 adds the suitability value corresponding to a new action to be added based on the action recognized by the action recognition unit 208 to the table of authentication mode suitability values. Thus, the action pattern is subdivided, thereby selecting automatically an authentication mode that is suitable for the user's action.

3. Second Embodiment of the Present Disclosure

The first embodiment of the present disclosure has been described. Subsequently, the second embodiment of the present disclosure is now described. In the second embodiment of the present disclosure, the authentication control system 10 is configured to include only an information processing device 100-2 in which the process of selecting an authentication mode is completed.

Figure 11:
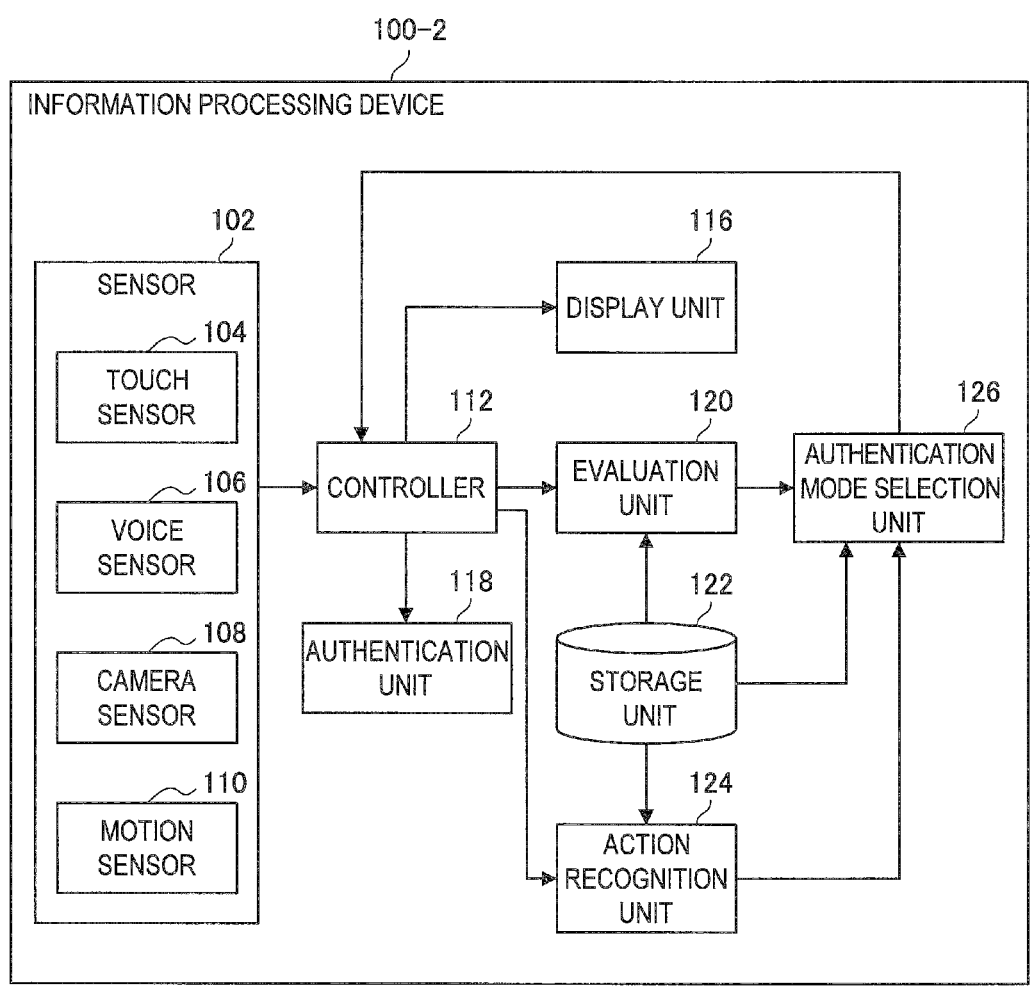
FIG. 11 is a schematic block diagram illustrating the functional configuration of an information processing device of an authentication control system according to a second embodiment of the present disclosure.

3-1. Configuration of Information Processing Device According to Second Embodiment of the Present Disclosure Referring to FIG. 11, the configuration of the information processing device 100-2 of the authentication control system 10 according to the second embodiment of the present disclosure is described. FIG. 11 is a schematic block diagram illustrating the functional configuration of the information processing device 100-2 of the authentication control system 10 according to the second embodiment of the present disclosure. The description of the configuration which is substantially the same as the configuration of the information processing device 100-1 and the authentication control device 200 according to the first embodiment of the present disclosure is omitted.

As illustrated in FIG. 11, the information processing device 100-2 is configured to include an evaluation unit 120, a storage unit 122, an action recognition unit 124, and an authentication mode selection nit 126, in addition to the sensor 102, the controller 112, the display unit 116, and the authentication unit 118.

The controller 112 controls the evaluation unit 120 and the action recognition unit 124 in addition to the display unit 116 and the authentication unit 118. Specifically, the controller 112 acquires sensor information from the sensor 102 and supplies the acquired sensor information to the evaluation unit 120 and the action recognition unit 124. In addition, the controller 112 controls the display unit 116 to display and allows the authentication unit 118 to perform authentication, based on the authentication mode selected by the authentication mode selection unit 126.

The functions of the evaluation unit 120, the storage unit 122, the action recognition unit 124, and the authentication mode selection unit 126 are substantially the same as those of the evaluation unit 204, the storage unit 206, the action recognition unit 208, and the authentication mode selection unit 210 according to the first embodiment of the present disclosure. So, repeated description is omitted.

Figure 12:
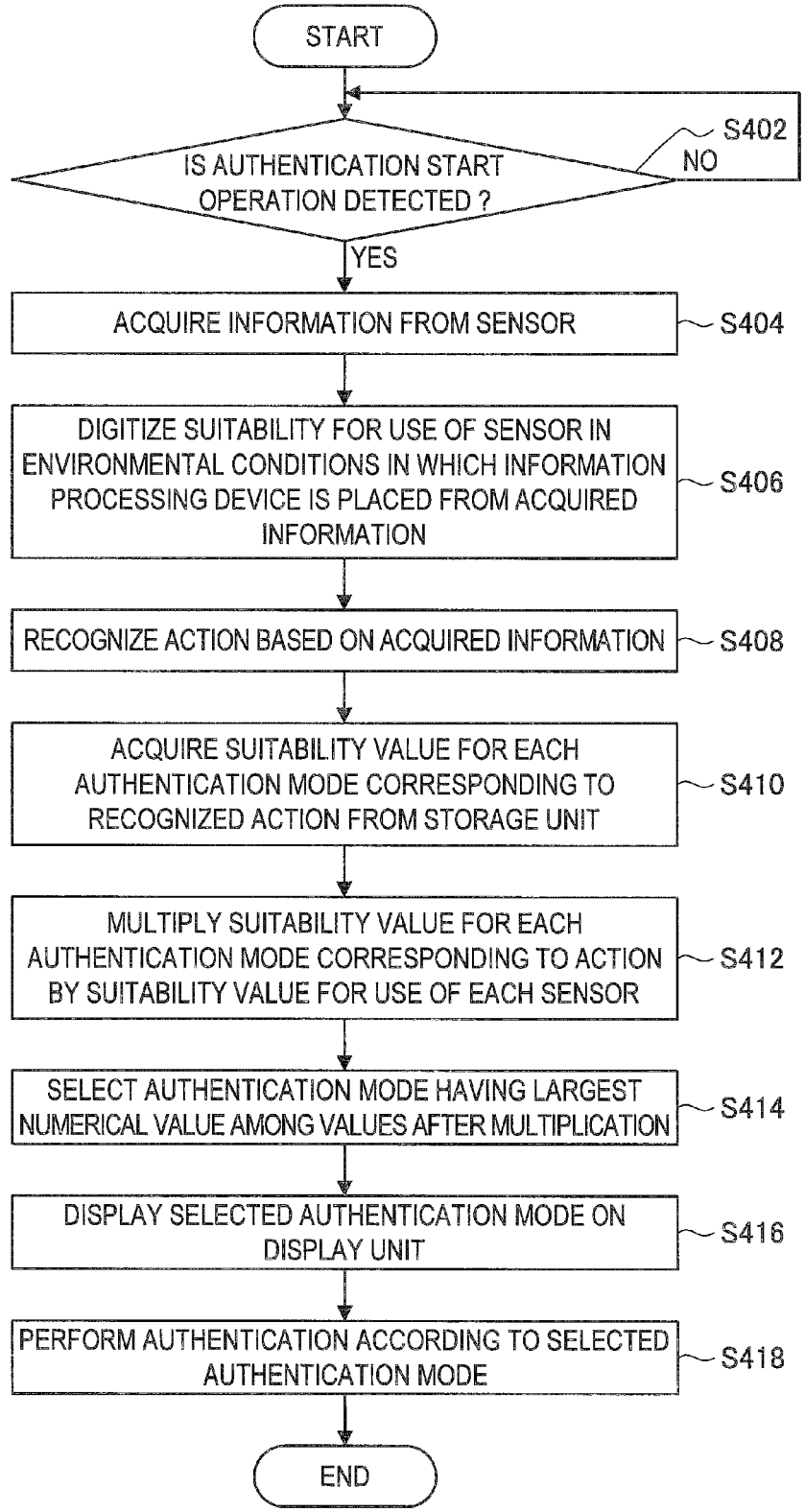
FIG. 12 is a flowchart illustrating schematically the processing by the information processing device of the authentication control system according to the second embodiment of the present disclosure.

3-2. Processing in Information Processing Device According to Second Embodiment of the Present Disclosure Referring to FIG. 12, the processing in the information processing device 100-2 of the authentication control system 10 according to the second embodiment of the present disclosure is described. FIG. 12 is a flowchart illustrating schematically the processing in the information processing device 100-2 of the authentication control system 10 according to the second embodiment of the present disclosure. The detailed description of the processing that is substantially the same as the processing of the first embodiment of the present disclosure is omitted.

The information processing device 100-2 waits for an authentication start operation to be detected (step S402).

If an authentication start operation is detected in step S402, the controller 112 acquires information from the sensor 102 (step S404).

Then, the evaluation unit 120 digitizes the suitability for use of a sensor in the environmental conditions in which the information processing device 100-2 is placed from the acquired information (step S406).

Then, the action recognition unit 124 recognizes an action based on the acquired information (step S408).

Then, the authentication mode selection unit 126 acquires a suitability value for each authentication mode corresponding to the recognized action (step S410).

Then, the authentication mode selection unit 126 multiplies a suitability value for each authentication mode corresponding to the action by the suitability value for use of each sensor (step S412).

Then, the authentication mode selection unit 126 selects an authentication mode having the largest numerical value among values obtained through the multiplication (step S414).

Then, the display unit 116 displays the selected authentication mode (step S416).

Then, the authentication unit 118 perform authentication in accordance with the selected authentication mode (step S418).

As described above, according to the second embodiment of the present disclosure, the information processing device 100-2 acquires sensor information and evaluates the suitability for use of each of one or more sensors in the environmental conditions indicated by the acquired sensor information. The information processing device 100-2 selects an authentication mode from among a plurality of authentication modes using a sensor, based on the results obtained by evaluating the suitability for use of a sensor and the action recognized using the sensor information. In this way, the process of selecting an authentication mode is completed in the information processing device 100-2, and thus it is possible to select automatically an authentication mode without being affected by a communication environment.

3-3. Modification of Second Embodiment of the Present Disclosure

The second embodiment of the present disclosure has been described. The present embodiment is not limited to the examples described above. A modification of the present embodiment is now described.

Figure 13:
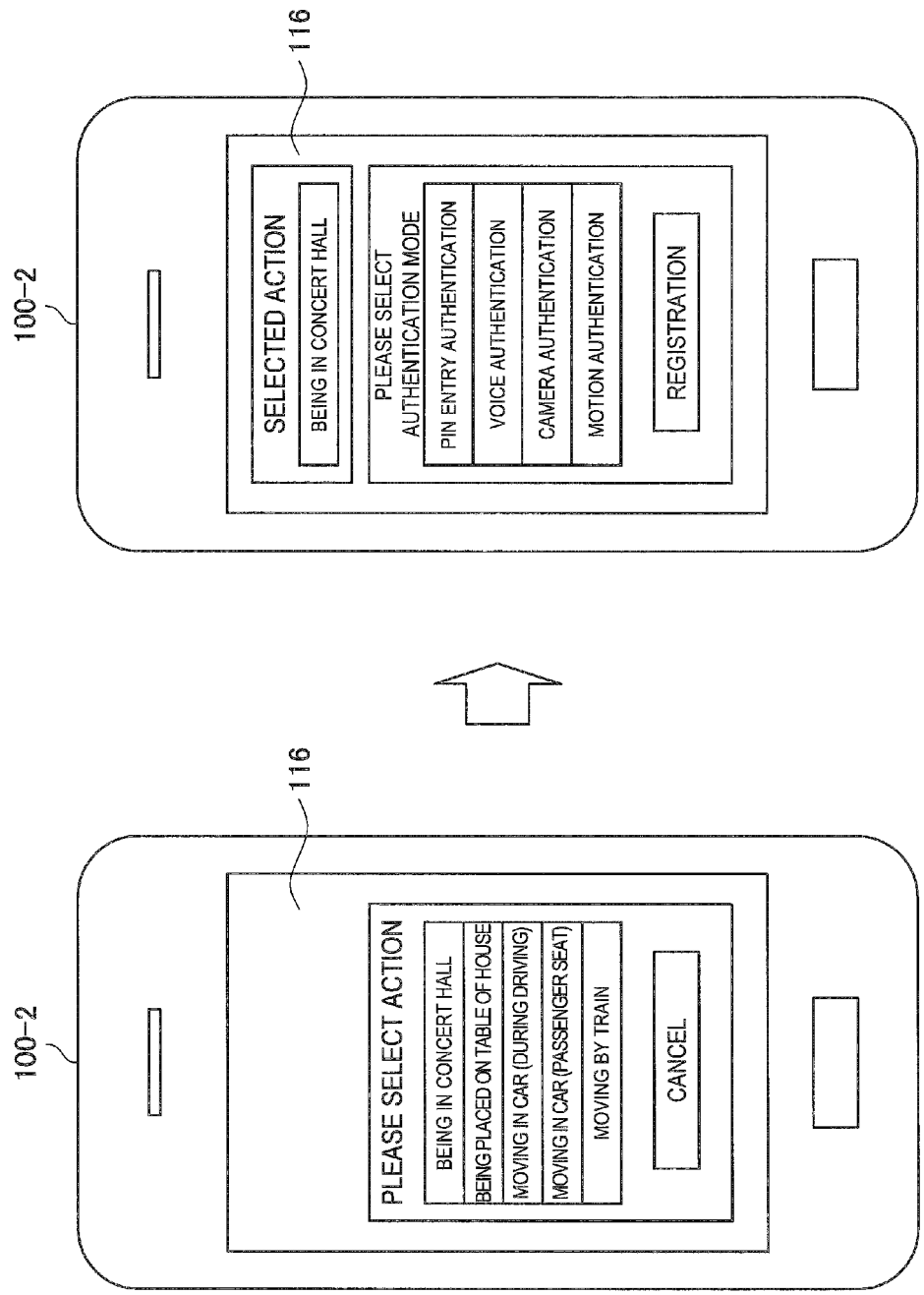
FIG. 13 is a diagram illustrating an example of the association between an action and an authentication mode by a user operation in an information processing device of an authentication control system according to a modification of the second embodiment of the present disclosure.

As a modification of the present embodiment, the information processing device 100-2 associates an action by the user operation with an authentication mode, and may select an authentication mode based on the association. Specifically, the information processing device 100-2 is configured to further include a registration unit that allows the storage unit 122 to store the association between an action recognized by the action recognition unit 124 and an authentication mode based on the user operation. When the association between the action recognized by the action recognition unit 124 and an authentication mode is stored in the storage unit 122, the authentication mode selection unit 126 selects an authentication mode corresponding to the association. For example, the description is given with reference to FIG. 13. FIG. 13 is a diagram illustrating an example of the association between an action and an authentication mode by the user operation in the information processing device 100-2 of the authentication control system 10 according to the modification of the second embodiment of the present disclosure.

The registration unit generates a GUI that allows the user to select an action, and the controller 112 allows the display unit 116 to display the GUI generated by the registration unit. For example, as illustrated in the left view of FIG. 13, the registration unit may acquire a list of actions stored in the storage unit 122 and generate a GUI that is used to select an action from the list of actions. The controller 112 may allow the display unit 116 to display the GUI generated by the registration unit.

Then, if the user selects an action, then the registration unit generates a GUI that allows the user to select an authentication mode, and the controller 122 allows the display unit 116 to display the GUI generated by the registration unit. For example, as illustrated in the right view of FIG. 13, the registration unit may acquire a list of authentication modes stored in the storage unit 122 and generate a GUI that is used to select an authentication mode from the list of authentication modes. The controller 112 may allow the display unit 116 to display the GUI generated by the registration unit.

Then, if the user selects an authentication mode and performs registration thereof, then the registration unit causes information regarding the association between the selected action and authentication mode to be stored in the storage unit 122. For example, as illustrated in FIG. 13, when the action of "being in a concert hall" is selected and the authentication mode of "PIN entry authentication" is selected, the registration unit causes information regarding the association between the action of "being in a concert hall" and the authentication mode of "PIN entry authentication" to be stored in the storage unit 122.

When the action recognition unit 124 recognizes the action corresponding to the association information stored in the storage unit 122 after the registration process described above is completed, the authentication mode selection unit 126 selects an authentication mode based on the association information. For example, when information regarding the association between the action of "being in a concert hall" and the authentication mode of "PIN entry authentication" is stored in the storage unit 122, if the action recognition unit 124 recognizes the action of "being in a concert hall", then the authentication mode selection unit 126 selects the PIN entry authentication as an authentication mode.

In this way, the information processing device 100-2 stores the association between an action and an authentication mode based on the user operation, and if the action corresponding to the stored association is recognized, the authentication mode corresponding to the association is selected. Thus, an action and an authentication mode are directly associated with each other based on the user operation, thereby selecting automatically and immediately an authentication mode suitable for the user's preference.

4. Hardware Configuration According to an Embodiment of the Present Disclosure Embodiments of the present disclosure have been described. The processing in the information processing device 100 described above is implemented by cooperation between software and hardware of the information processing device 100 described below.

Figure 14:
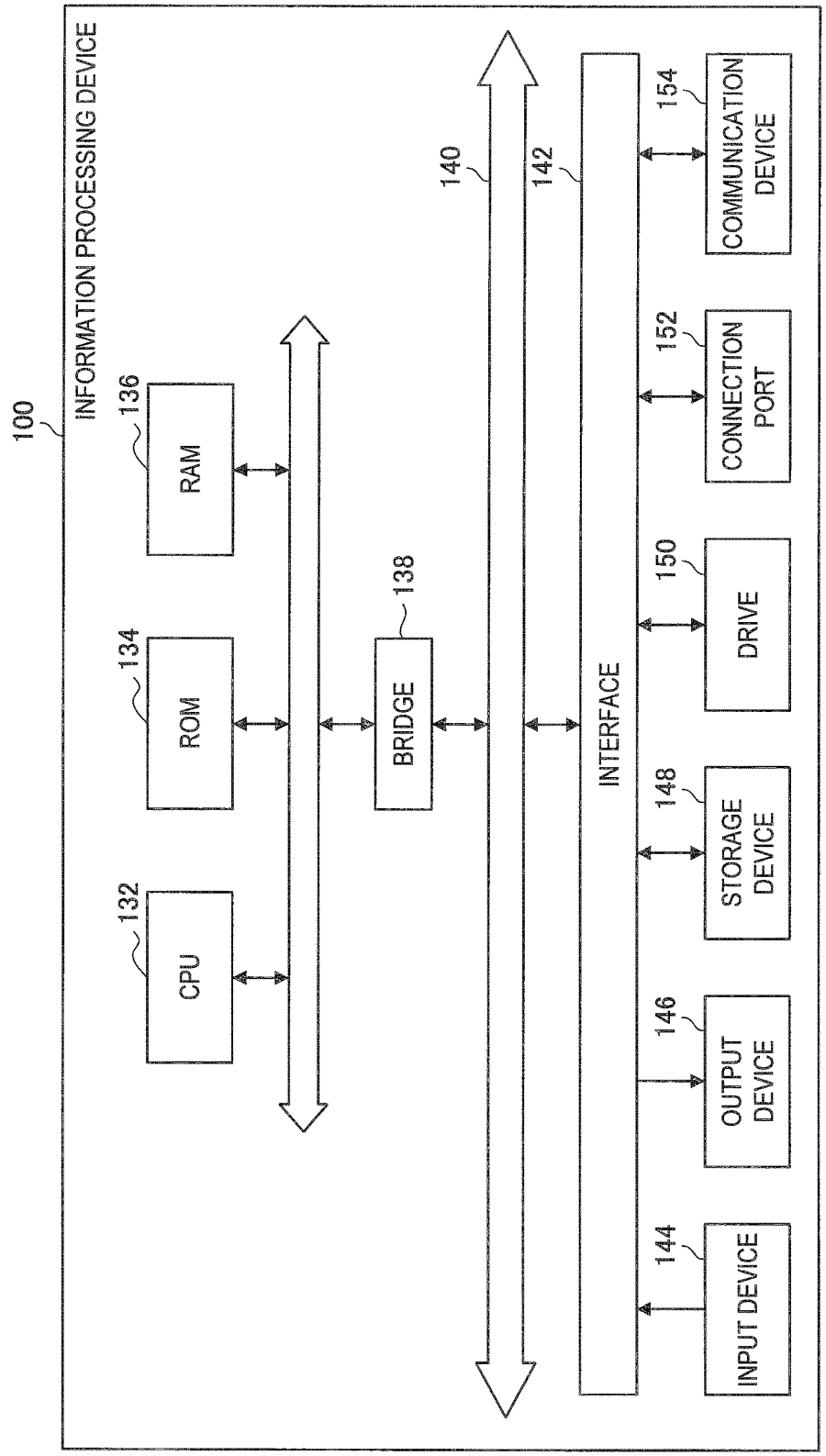
FIG. 14 is a diagram for describing the hardware configuration of the information processing device according to an embodiment of the present disclosure.

FIG. 14 is a diagram for describing the hardware configuration of the information processing device 100 according to an embodiment of the present disclosure. As illustrated in FIG. 14, the information processing device 100 is configured to include a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 serves as an arithmetic processing unit and a control device, and implements the operations of the controller 112, the authentication unit 118, the evaluation unit 120, the action recognition unit 124, the authentication mode selection unit 126, and the registration unit, which are included in the information processing device 100, in cooperation with various programs. In addition, the CPU 132 may be a microprocessor. The ROM 134 stores, for example, a program used by the CPU 132 or an operation parameter. The RAM 136 temporarily stores a program used in the execution of the CPU 132, a parameter varying appropriately in the execution thereof, and the like. A portion of the storage unit 122 included in the information processing device 100 is implemented by the ROM 134 and the RAM 136. The CPU 132, the ROM 134, and the RAM 136 are connected to each other through an internal bus composed of a CPU bus or the like.

The input device 144 is configured to include an input means, an input control circuit, or the like. The input means is used to allow the user to input information and includes a mouse, a keyboard, a touch panel, a button, a microphone, a switch, and a lever. The input control circuit generates an input signal based on information obtained from the sensor 102 provided in the information processing device 100 and an input by the user, and it outputs the signal to the CPU 132. The user of the information processing device 100 can operate the input device 144 to allow various data to be inputted to the information processing device 100 or instruct the information processing device 100 to perform a processing operation.

The output device 146 is an example of the display unit 116 of the information processing device 100, and performs an output operation to a device, such as a liquid crystal display (LCD), an organic light emitting diode (OLED), and a lamp. Furthermore, the output device 146 may include a loudspeaker and a headphone for outputting sound.

The storage device 148 is a device for data storage, which is configured as an example of the storage unit 122 of the information processing device 100. The storage device 148 may be configured to include a storage medium, a recording device for recording data in the storage medium, a reading device for reading the data from the storage medium, and a deleting device for deleting data recorded in the storage medium. The storage device 148 stores a program executed by the CPU 132 and various types of data.

The drive 150 is a reader-writer for a storage medium and is embedded in the image processing device 100 or is attached externally. The drive 150 reads out information recorded on a removable storage medium that is attached thereto, such as a magnetic disk, an optical disk, a magneto-optical disk, or a semiconductor memory, and it outputs the information to the RAM 136. In addition, the drive 150 is also able to write information to a removable storage medium.

The connection port 152 may be a bus that is used to connect with an information processing device, an authentication control device 200, or peripheral equipment outside the information processing device 100. In addition, the connection port 152 may be universal serial bus (USB).

The communication device 154 is an example of the communication unit 114 of the information processing device 100, and it may be a communication interface composed of a communication device used to connect to a network. In addition, the communication device 154 may be an infrared communication compatible device, a wireless local area network (LAN) compatible communication device, a long-term evolution (LTE) compatible communication device, or a wired communication device that performs communication by wire.

5. Conclusion

According to the first embodiment of the present disclosure, the suitability for use of a sensor is evaluated in the environmental conditions indicated by sensor information, and thus it is possible to select automatically an authentication mode using a sensor suitable for the environmental conditions in which the information processing device 100-1 is placed. In addition, according to the second embodiment of the present disclosure, the process of selecting an authentication mode is completed in the information processing device 100-2, and thus it is possible to select automatically an authentication mode without depending on a communication environment.

Although the preferred embodiments of the present disclosure have been described above with reference to the accompanying drawings, the technical scope of the present disclosure is not limited to the above examples. Any person skilled in the field of the present disclosure may find various alterations and modifications within the scope of the appended claims, and it should be understood that they will naturally come under the technical scope of the present disclosure.

For example, in the above embodiments, the information processing device 100 displays a selected authentication mode, but the present disclosure is not limited to this example. For example, the information processing device 100 may not display a selected authentication mode. As a result, if a third party who is not the owner attempts to unlock by the authentication of the information processing device 100, the third party is very difficult to identify which authentication mode is selected, and thus it is possible to reduce the authentication success rate by the third party and to improve the security level of the information processing device 100.

Moreover, it is possible to create a computer program that causes the hardware incorporated in the information processing device 100 according to an embodiment of the present disclosure to perform a function equivalent to each component of the information processing device 100 according to the above embodiments. In addition, a storage medium for storing the computer program may be provided. The computer program can be distributed from the authentication control device 200 or other information processing device to the information processing device 100. For example, the computer program can be downloaded from a server for providing application distribution service such as Google Play or App Store and can be installed in the information processing device 100.

Note that the advantages mentioned herein are to be considered illustrative or exemplary rather than restrictive. The technology according to the embodiments of the present disclosure can provide other advantages apparent to those skilled in the art from the description given herein, in addition to or as an alternative to the above advantages.

Additionally, the present technology may also be configured as below.

What is claimed is:

1. An authentication control system, comprising:
a storage unit;
a Central Processing Unit (CPU) configured to:
acquire first information of a user detected by at least one sensor of a plurality of sensors;
evaluate suitability for use of each of the plurality of sensors in environmental conditions indicated by the first information of the user to obtain evaluation results for the plurality of sensors, wherein each evaluation result for each of the plurality of sensors is obtained by multiplying a suitable value of each of the plurality of sensors with a value relating to the acquired first information of the user;
digitize the evaluation result for each of the plurality of sensors;
associate each authentication mode of a plurality of authentication modes with each of the digitized evaluation result for each of the plurality of sensors;
select a first authentication mode associated with a digitized evaluation result having a largest numerical value from among the evaluation results of the plurality of sensors; wherein each of the plurality of authentication modes is configured to use one or more sensors of the plurality of sensors;
receive information associated with the first authentication mode selected; and
authenticate the user based on the first information acquired using the first authentication mode selected.

2. The authentication control system according to claim 1, wherein the CPU is further configured to recognize an action of the user based on the acquired first information, and
wherein the CPU is further configured to select the first authentication mode of the plurality of authentication modes based on the digitized evaluation result having the largest numerical value and the recognized action.

3. The authentication control system according to claim 2, wherein the storage unit configured to store a second information corresponding to the action of the user recognized by the CPU in association with each of the plurality of authentication modes,
wherein the CPU is further configured to acquire the second information corresponding to the recognized action of the user from the storage unit and select the first authentication mode of the plurality of authentication modes based on the digitized evaluation result having the largest numerical value and the acquired second information corresponding to the action of the user.

4. The authentication control system according to claim 3, wherein the CPU, based on a use of a second authentication mode of the plurality of authentication modes, the second authentication mode being other than the selected first authentication mode, is further configured to change the second information corresponding to the action of the user stored in the storage unit in a manner that the second authentication mode of the plurality of authentication modes is more likely to be selected than remaining authentication modes of the plurality of authentication modes.

5. The authentication control system according to claim 3, wherein the CPU, based on a use of a third authentication mode of the plurality of authentication modes, the third authentication mode being other than the selected first authentication mode, is further configured to allow the storage unit to store a third information corresponding to the action of the user recognized by the CPU in association with each of the plurality of authentication modes.

6. The authentication control system according to claim 3, wherein the second information that corresponds to the action of the user and is stored in the storage unit is a numerical value.

7. The authentication control system according to claim 3, wherein the CPU is further configured to allow the storage unit to store an association between the recognized action of the user and the first authentication mode of the plurality of authentication modes based on a user operation, and
wherein the CPU is further configured to select, based on the stored association between the recognized action of the user and the first authentication mode of the plurality of authentication modes, the first authentication mode of the plurality of authentication modes.

8. The authentication control system according to claim 3, further comprising:
a display unit,
wherein the CPU is further configured to display the selected first authentication mode in the display unit.

9. The authentication control system according to claim 1, wherein the CPU is further configured to acquire the first information of the user from an information processing device that includes the plurality of sensors, and
wherein the authentication control system further includes a transmission unit configured to transmit authentication mode information that indicates the selected first authentication mode to the information processing device.

10. The authentication control system according to claim 1, wherein the CPU is provided in the information processing device that includes the plurality of sensors.

11. An authentication control method, comprising:
acquiring, by a Central Processing Unit (CPU), information of a user detected by at least one sensor a of a plurality of sensors;
evaluating, by the CPU, suitability for use of each of the plurality of sensors in environmental conditions indicated by the acquired information of the user to obtain evaluation results for the plurality of sensors, wherein each evaluation result for each of the plurality of sensors is obtained by multiplying a suitable value of each of the plurality of sensors with a value relating to the acquired information of the user;
digitizing, by the CPU, the evaluation result for each of the plurality of sensors;
associating, by the CPU, each authentication mode of a plurality of authentication modes with each of the digitized evaluation result for each of the plurality of sensors;
selecting, by the CPU, an authentication mode associated with a digitized evaluation result having a largest numerical value from among the evaluation results of the plurality of sensors; wherein each of the plurality of authentication modes is configured to use one or more sensors of the plurality of sensors;
receiving, by the CPU, information associated with the first authentication mode selected; and
authenticating, by the CPU, the user based on the acquired information of the user using the first authentication mode selected.

12. A non-transitory computer-readable storage medium having stored thereon computer-executable instructions that, when executed by a processor, cause the processor to perform operations, the operations comprising:
acquiring, by the processor, information of a user detected by at least one sensor of a plurality of sensors:
evaluating, by the processor, suitability for use of each of the plurality of sensors in environmental conditions indicated by the acquired information of the user to obtain evaluation results for the plurality of sensors, wherein each evaluation result for each of the plurality of sensors is obtained by multiplying a suitable value of each of the plurality of sensors with a value relating to the acquired information of the user;
digitizing, by the processor, the evaluation result for each of the plurality of sensors;
associating, by the processor, each authentication mode of a plurality of authentication modes with each of the digitized evaluation result for each of the plurality of sensors;
selecting, by the processor, an authentication mode associated with a digitized evaluation result having a largest numerical value from among the evaluation results of the plurality of sensors; wherein each of the plurality of authentication modes is configured to use one or more sensors of the plurality of sensors;
receiving, by the processor, information associated with the first authentication mode selected; and
authenticating, by the processor, the user based on the acquired information of the user using the first authentication mode selected.

* * * * *